March 31, 1925. 1,531,759
A. ROSENTHAL
CORN HUSKER
Filed March 10, 1924
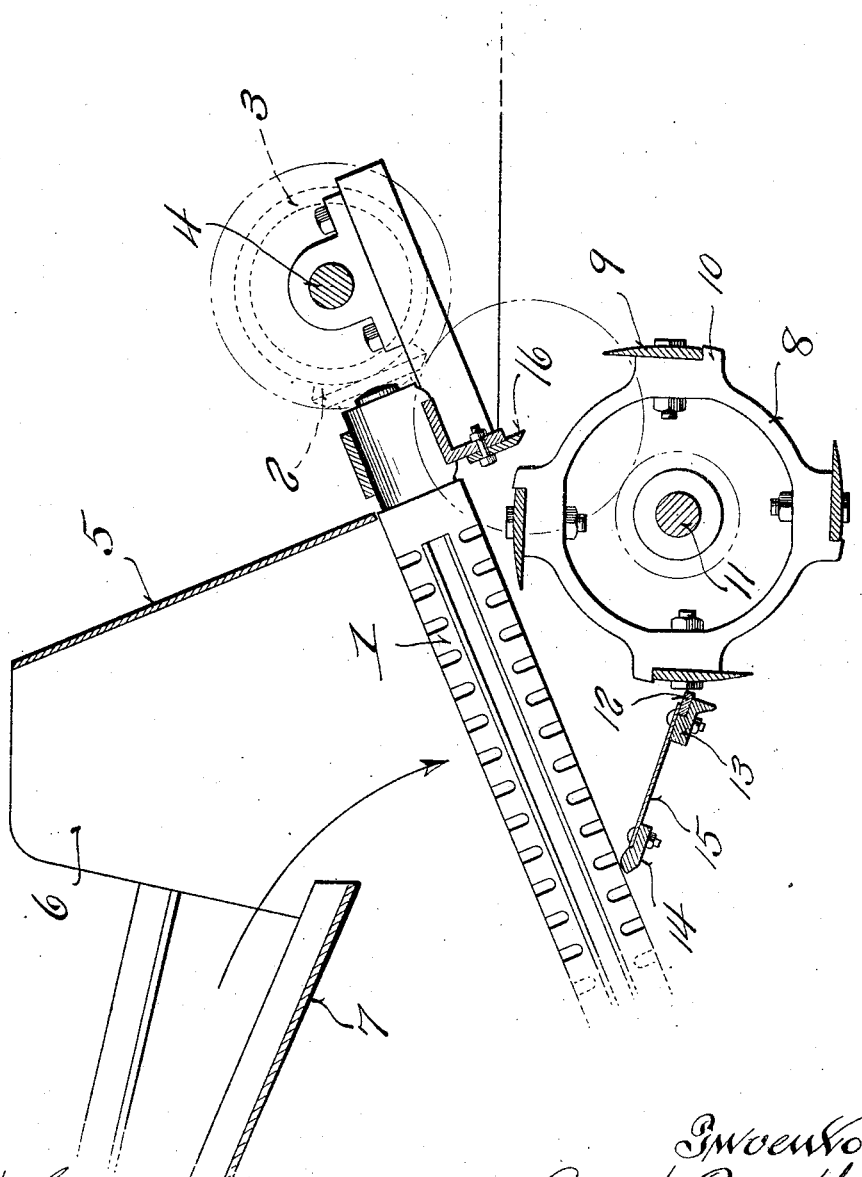

Patented Mar. 31, 1925.

1,531,759

UNITED STATES PATENT OFFICE.

AUGUST ROSENTHAL, OF WEST ALLIS, WISCONSIN, ASSIGNOR TO ROSENTHAL MANUFACTURING CO., OF WEST ALLIS, WISCONSIN.

CORN HUSKER.

Application filed March 10, 1924. Serial No. 698,034.

*To all whom it may concern:*

Be it known that I, AUGUST ROSENTHAL, a citizen of the United States, and resident of West Allis, in the county of Milwaukee and State of Wisconsin, have invented certain new and useful Improvements in Corn Huskers; and I do hereby declare that the following is a full, clear, and exact description thereof.

This invention relates to corn husking and cutting machines.

This invention is a division of my co-pending application, Serial No. 639,502, filed May 17, 1923, for corn huskers.

In machines of this general type in which husking rolls have been provided and adapted to receive the stalks and husks of the corn, difficulty has been experienced in securing the desired clean and short cut for fine fodder, due to the wedging and clogging of the material between the cutter located below the rolls and the rollers, and also due to wedging of the material between the cutters and the shear bar and associated parts.

A further defect in the machines as heretofore constructed, which has caused considerable difficulty in their successful operation, has been due to the fact that the stalks were frequently fed in such a manner as to be presented to the upwardly or rising knives of the cutter, thus burdening the cutter with the extra load of carrying the stalks over and forwardly against the shear bar. In other words, the cutter was required not only to sever the stalks and husks, but also to fold or crumple the stalks into a crowded position against the shear bar before such stalks could be cut. The net result of these defects was an unusual amount of power required for the operation of a cutter, and a generally ineffective and inefficient cutting of the material to the extent of rendering a clean short cut impossible.

A further serious difficulty experienced with the machines, as heretofore constructed, was the relatively inaccessible mounting of the cutters, and considerable dismantling of other parts of the machine had to be done before the cutter could be reached for adjustment or repair.

This invention is designed to overcome the above noted defects, and objects of such invention are to provide a corn husking machine in which all of the material is fed forwardly of a vertical plane through the center line of the cutter, in which no material is fed rearwardly of the cutter, in which the cutter and the shear bar are located closely adjacent the rolls and beneath the upper ends thereof, in which there is no crumpling or throwing of the material upwardly, and forwardly by the cutters, in which there is no wedging, in which the cutter executes a direct cut upon the material independently of the shear bar while such material is held by the rolls in addition to its cooperative cutting action with the shear bar, in which a clean cut, unobstructed and free, is secured by the machine, with a minimum expenditure of power, in which the cutter head is so positioned as to render the knives and parts thereof readily accessible, and in which a short clean cut is provided, whereby the desired fine fodder is obtained.

An embodiment of the invention is shown diagrammatically in the accompanying drawing, in which:—

The single figure is a vertical sectional view through the upper end of the feed rolls showing the cutter and associated parts in their relative position, the major portion of the structural details of the husking machine being omitted for the sake of clearness.

The machine comprises a plurality of downwardly and forwardly slanting husking rolls 1, which may conveniently be driven by means of bevel gears 2 carried at their upper end, and meshing with similar bevel gears 3 mounted upon a transverse driving shaft 4. Adjacent the extreme upper end of the rolls a vertical plate 5 is provided and is equipped with side flanges 6. A chute 7 cooperates with the plate 5 and forms therewith a feeding hopper located above and adjacent the upper ends of the husking roll.

Immediately below the upper ends of the husking rolls a rotary cutter 8 is positioned. This cutter is provided with a plurality of knives 9 detachably bolted thereto and having their rear ends seating against projection 10 integral with the main body of the cutter. The cutter is rigidly mounted upon a horizontal driving shaft 11 and it is to be particularly noted that a vertical plane through the center line of the cutter passes rearwardly of the feeding hopper so that all material fed to the machine passes forwardly of this vertical plane through the center line of the cutter, and thus no material is fed to the rear portion or upwardly traveling portion of the cutter. A shear bar 12 is carried in a suitable bracing transverse member 13 and is mounted in front of the cutter, and in close proximity to the knives. A second transverse member 14 is provided immediately adjacent and beneath the rolls and is joined to the member 13 by means of a plate 15. This composite structure, therefore, constitutes in effect a shear bar and apron located in close proximity to the upper ends of the rolls.

In the operation of this machine, the stalks of corn and husks are fed through the feeding hopper to the husking rolls 1, which separate the corn from the stalks and husks in the usual manner. The stalks and husks are passed directly between the feed rolls and forwardly of the vertical plane through the central line of the cutter. Thus it will be seen that the stalks fed through the rolls at their upper ends, where the knives begin their cutting stroke, will be presented vertically to the knives, insuring a clean sharp cut, and wholly preventing binding and wedging of the stalks, as no extended length of stalk is allowed to gather. Futher, inasmuch as the apron 15, which guides the stalks to the cutter bar 12, is positioned substantially radially to the axis of the cutter head, the stalks at this point, as well as throughout the entire cutting path of the knives will also be presented at approximately right angles to the cut.

Most obviously, a minimum amount of power is required for the operation of this machine, as all of the power is used in the cutting action per se, and is not wasted in needless wedging, binding or bending of the stalks.

In order to prevent material, which has fallen beneath the cutter, from passing upwardly under any unusual conditions, a knife or member 16 is secured rearwardly of the vertical plane through the center line of the cutter. This member or knife cooperates with the knives 9 of the cutter to sever any material that may inadvertently be projected upwardly into this location, and prevents any tendency to feed material over the rear of the cutter head.

It is intended that the member 8 is to represent either a cutter alone or a combined cutter and shredder in accordance with the usual practice in this field of work, and that the term cutting shall not be given its strictest interpretation as used in this specification, and in the claims.

It will be seen that a combined husking and cutting machine has been provided in which no material is fed rearwardly of the cutter, in which the cutter executes a free and unobstructed stroke upon the material, in which there is no binding or wedging or crumpling of the material, in which a minimum amount of power is required, and in which the cutter head and parts are readily accessible being positioned adjacent the rear of the rolls.

Although the invention has been described in considerable detail, it is to be understood that the invention may be variously embodied and is, therefore, to be limited only as claimed.

I claim:

1. A corn husking and cutting machine comprising a plurality of downwardly and forwardly slanting husking rolls, a rotary cutter located immediately below and closely adjacent the upper ends of said rolls, a shear bar located in front of said cutter, and an apron extending upwardly from said shear bar into proximity to said rolls.

2. In a corn husking and cutting machine, the combination of a plurality of downwardly and forwardly slanting husking rolls, a rotary cutter located immediately below and closely adjacent the upper ends of the rolls, a shear bar located in front of said cutter bar, and spaced from said rolls, an apron for guiding material from the rolls to said shear bar and a depending knife positioned at the rear of said cutter head to prevent discharge of uncut material from the cutter.

In testimony that I claim the foregoing I have hereunto set my hand at West Allis, in the county of Milwaukee and State of Wisconsin.

AUGUST ROSENTHAL.